(12) United States Patent
Hart et al.

(10) Patent No.: US 7,022,240 B2
(45) Date of Patent: Apr. 4, 2006

(54) METHOD FOR ON-SITE TREATMENT OF OIL AND GAS WELL WASTE FLUIDS

(75) Inventors: Paul John Hart, Indiana, PA (US); Rebecca K. Snyder, Indiana, PA (US)

(73) Assignee: Hart Resource Technologies, Inc., Creekside, PA (US)

( * ) Notice: Subject to any disclaimer, the term of this patent is extended or adjusted under 35 U.S.C. 154(b) by 0 days.

(21) Appl. No.: 10/342,607

(22) Filed: Jan. 15, 2003

(65) Prior Publication Data

US 2004/0134860 A1    Jul. 15, 2004

(51) Int. Cl.
B01D 21/01    (2006.01)

(52) U.S. Cl. .................. 210/712; 175/66; 210/724; 210/738; 210/747; 210/804; 210/806

(58) Field of Classification Search ............ 175/66; 210/712, 717, 724, 725, 726, 727, 738, 747, 210/804, 806
See application file for complete search history.

(56) References Cited

U.S. PATENT DOCUMENTS

| | | | |
|---|---|---|---|
| 4,127,482 A * | 11/1978 | Watson et al. .......... 210/727 |
| 4,199,680 A | 4/1980 | Moon |
| 4,353,803 A * | 10/1982 | Dover, Jr. ............. 210/728 |
| 4,366,063 A * | 12/1982 | O'Connor ............. 210/652 |
| 4,428,842 A | 1/1984 | House et al. |
| 4,436,635 A | 3/1984 | Abrams et al. |
| 4,465,598 A | 8/1984 | Darlington et al. |
| 4,536,286 A | 8/1985 | Nugent |
| 4,634,533 A | 1/1987 | Somerville et al. |
| 4,725,362 A | 2/1988 | Dugat |
| 4,741,386 A | 5/1988 | Rappe |
| 4,751,887 A | 6/1988 | Terry et al. |
| 4,774,007 A * | 9/1988 | Gordon ................ 210/766 |
| 4,779,677 A | 10/1988 | Cobb |
| 4,809,778 A | 3/1989 | Johnson |
| 4,895,665 A | 1/1990 | Colelli et al. |
| 4,913,585 A * | 4/1990 | Thompson et al. ..... 405/129.25 |
| 5,093,008 A | 3/1992 | Clifford, III. |
| 5,310,002 A | 5/1994 | Blauch et al. |
| 5,364,532 A | 11/1994 | Bellos et al. |
| 5,433,863 A | 7/1995 | Braden et al. |
| 5,520,803 A | 5/1996 | Russell et al. |
| 5,656,136 A | 8/1997 | Gayaut et al. |
| 5,695,642 A | 12/1997 | Greenleigh et al. |
| 5,814,230 A | 9/1998 | Willis et al. |
| 6,027,649 A | 2/2000 | Benedek et al. |
| 6,059,977 A | 5/2000 | Rowney et al. |

(Continued)

Primary Examiner—Peter A. Hruskoci
(74) Attorney, Agent, or Firm—Meyer, Unkovic & Scott, LLP; David G. Oberdick, Esq.

(57) ABSTRACT

An apparatus and method for on-site treatment and reclamation of oil and gas well waste water or fracturing fluids. The mobile treatment process and apparatus provide both chemical precipitation and filtration to treat the drilling fluid waste to a technically and environmentally acceptable level allowing for reuse. Alkaline treating agents are applied to the drilling waste fluids, as they are pumped through the treatment apparatus, to increase the pH of the fluid waste to a preferred pH range and to also cause selective soluble contaminants in the fluids to form a precipitate. The waste fluid is allowed to clarify as the precipitate of insoluble contaminants, through flocculation, settle and form a sludge at the bottom of the drilling pit. The clarified fluids are then filtered to satisfy applicable industry and environmental requirements.

26 Claims, 1 Drawing Sheet

U.S. PATENT DOCUMENTS

| | | |
|---|---|---|
| 6,177,014 B1 | 1/2001 | Potter et al. |
| 6,207,059 B1 | 3/2001 | Moore, III |
| 6,346,197 B1 | 2/2002 | Stephenson et al. |
| 6,391,195 B1 * | 5/2002 | Layton .................... 210/195.1 |
| 6,881,349 B1 * | 4/2005 | Mueller ....................... 210/708 |
| 2001/0049403 A1 | 12/2001 | Burts, Jr. |
| 2002/0007953 A1 | 1/2002 | Liknes |
| 2002/0022059 A1 | 2/2002 | Nier et al. |
| 2002/0030001 A1 | 3/2002 | Napper et al. |
| 2002/0040874 A1 | 4/2002 | Kantzas et al. |
| 2002/0056688 A1 | 5/2002 | Stephenson et al. |
| 2002/0096472 A1 | 7/2002 | Smith et al. |

* cited by examiner

# METHOD FOR ON-SITE TREATMENT OF OIL AND GAS WELL WASTE FLUIDS

FIELD OF THE INVENTION

This invention relates to a method for on-site treatment and reclamation of oil and gas well waste water or fracturing fluids. In a preferred embodiment, a mobile apparatus is used to chemically treat and filter waste fluids produced at oil and gas well drilling sites so that these fluids can be reused.

BACKGROUND AND SUMMARY OF THE INVENTION

It is well known that oil and gas well exploration involves the generation of waste water products, including fluid wastes in the nature of either drilling fluids or fracture or return fluids from the drilling operation. Typically, drilling pits are excavated by a well operator, near the drilling site, to receive these fluid waste products. Environmental clean-up requirements, imposed by the EPA and local government agencies, require the responsible party associated with the drilling operations to remediate the drilling site and, in particular, any drilling pits and related fluid waste products.

Depending upon applicable environmental requirements, responsible parties associated with drilling operations have had limited options in respect to clean up of drilling pits and related fluid waste products. In certain states, it is possible to pump the waste fluids into an injection well, e.g., an exhausted oil or gas well, after the fluid waste is filtered and, possibly, chemically treated. In states with more stringent environmental requirements, such as Pennsylvania, the responsible party associated with the drilling operations typically is forced to incur the expense of transporting the fluid waste products in the drilling pits to a properly licensed disposal site and/or reclamation operation.

In the context of offsite drilling waste fluids treatment, the prior art discloses various processes for chemical treatment or filtration of the contaminants within this fluid waste. For example, U.S. Pat. No. 4,465,598 teaches the precipitation of metals including iron, nickel, chromium, cobalt, and manganese in oil and gas well heavy brines which have been filtered initially to remove solids. U.S. Pat. No. 4,634,533 teaches an oil and gas well brine treatment including an initial oxidizing treatment to convert iron to the ferric state. U.S. Pat. No. 5,814,230 describes an apparatus and method for separation of solids from liquid for use with different processes. In particular, this invention describes the separation of solids from a liquid flow using an endless conveyor carrying screen filters which dredge gravity-settled solids from the bottom of a settling tank and filter solids suspended in the flowing liquid. The solids are further dewatered while on the filters using a combination of vibration and air streams. U.S. Pat. No. 4,436,635 describes a filtering process for filtration of oil and gas well treatment fluids.

Offsite treatment of drilling waste fluids is uneconomical, however, because of the transportation costs associated in transporting the fluid waste to a reclamation or treatment area. As such, it has become desirable for responsible parties involved in well drilling operations to attempt to reuse fluid waste. In particular, absent permitted reuse of the drilling fluid waste products, the drilling operator is required to use new, fresh water for ongoing drilling operations. In the absence of a ready source for such fresh water, or in drought conditions, the drilling operator is required to bring water on-site for the continuing drilling operations, which again involves a high trucking cost for the movement of water. Thus, a need exists to develop an economical method for on-site treatment of drilling fluid wastes which would allow these fluid wastes, after treatment, to be reused in drilling operations.

The prior art reveals several efforts to address this need, however, these efforts continue to involve high economic costs and/or do not satisfy strict environmental requirements that exist for fluid reuse in certain states. For example, U.S. Pat. No. 4,895,665 teaches a method for treating and reclaiming oil and gas well working fluids and the related drilling pits. In particular, this patent teaches a method of chemical treatment and filtration of oil and gas well working fluids within the associated drilling pits. In contrast to the present invention, however, the primary purpose of this patent is to prepare a drilling pit for closure through reduction of the fluid content in sludge which is formed in the drilling pit. While the water treated through the teachings of the '665 patent can be reused, the process taught by the '665 patent is much more expensive and time consuming than the present invention.

U.S. Pat. No. 5,093,008 (the "'008 patent") teaches a process and apparatus for recovering reusable water from waste drilling fluid. More specifically, this invention teaches a dewatering process and apparatus for concurrent reutilization of water in waste drilling fluids from an active drilling operation that includes a storage area, an intermixer for introducing treatment chemicals into the waste drilling fluids and a centrifuge. Flocculation is chemically induced in the waste drilling fluids as they pass through the intermixing needs for introducing treatment chemicals into the waste drilling fluids. The waste drilling fluids are then transferred to a centrifuge where solid waste is separated from clear, reusable water. The water is returned to the storage area and may be chemically adjusted prior to being returned to the drilling rig. Unlike the present invention, however, the '008 patent does not involve treatment of waste fluid water in the drilling pit, and the '008 patent involves a process which is much more complicated and expensive than the present invention.

U.S. Pat. No. 4,536,286 (the "'286 patent") describes a self-contained, portable waste treatment system for hazardous and non-hazardous waste comprising a pair of mixing tanks. Solids are removed from fluid waste streams by flocculation and related solids deposition. The primary purpose of the '286 patent is waste water clean-up in connection with a variety of processes including chemical manufacturing, food processing, mining and the exploration and drilling of oil and gas wells. The '286 patent does not contemplate reuse of drilling fluid waste after treatment. Also, unlike the present invention, the '286 patent does not provide for a filtration step. Further, the present invention allows for treatment of a greater volume of waste water in less time.

Finally, U.S. Pat. No. 5,520,803 (the "'803 patent") describes a mobile waste water treatment device. The '803 patent is described as having particular application for the treatment of heavy metals, paint residues, fats, oils, and grease and is not described as having application to waste fluids resulting from oil and gas well drilling operations.

In contrast to this prior art, the present invention provides a mobile waste water treatment system designed for specific use in the drilling pits associated with oil and gas well drilling operations. As described more fully below, the present invention provides an economical means of treating drilling waste fluids so that they can be either reused at the same site or transported to a new drilling operation.

SUMMARY OF THE INVENTION

In accordance with the present invention, on-site treatment of drilling waste fluids from oil and gas well operations is provided through a mobile apparatus that treats waste fluids in drilling pits and permits and allows for reuse of the treated fluids in future drilling operations.

The mobile treatment process and apparatus of the present invention are designed to work at the drilling pit or other waste fluid collection areas associated with oil and gas well drilling operations and, more specifically, the drilling fluid wastes which are deposited within these drilling pits or collection areas. In general, the mobile treatment process and apparatus of the present invention provides both chemical precipitation and filtration to treat the drilling fluid waste to a technically and environmentally acceptable level allowing for reuse. More specifically, alkaline treating agents are applied to the drilling waste fluids, as they are pumped through the treatment apparatus, to increase the pH of the fluid waste to a preferred pH range and to also cause selective soluble contaminants in the fluids to form a precipitate. After the addition of this alkaline agent, the waste fluid is allowed to clarify as the precipitate of insoluble contaminants, through flocculation, settle and form a sludge at the bottom of the drilling pit. The clarified fluids are then filtered to satisfy applicable industry and environmental requirements.

The treated fluid waste may thereafter be used in new drilling operations at the same or other drilling sites. On-site treatment of the drilling fluid waste, as provided by the present invention, eliminates the high cost associated with transporting fluid waste to an offsite reclamation or disposal facility. Waste water treatment, in the fluid waste collection areas (e.g., drilling pits), also reduces the chance of groundwater contamination and provides reusable water, for use in new drilling operations, at a lower cost.

BRIEF DESCRIPTION OF THE DRAWINGS

For the present invention to be easily understood and readily practiced, the invention will now be described, for the purposes of illustration and not limitation, in conjunction with the following figures, wherein.

DETAILED DESCRIPTION OF THE PREFERRED EMBODIMENT

Figure 1:
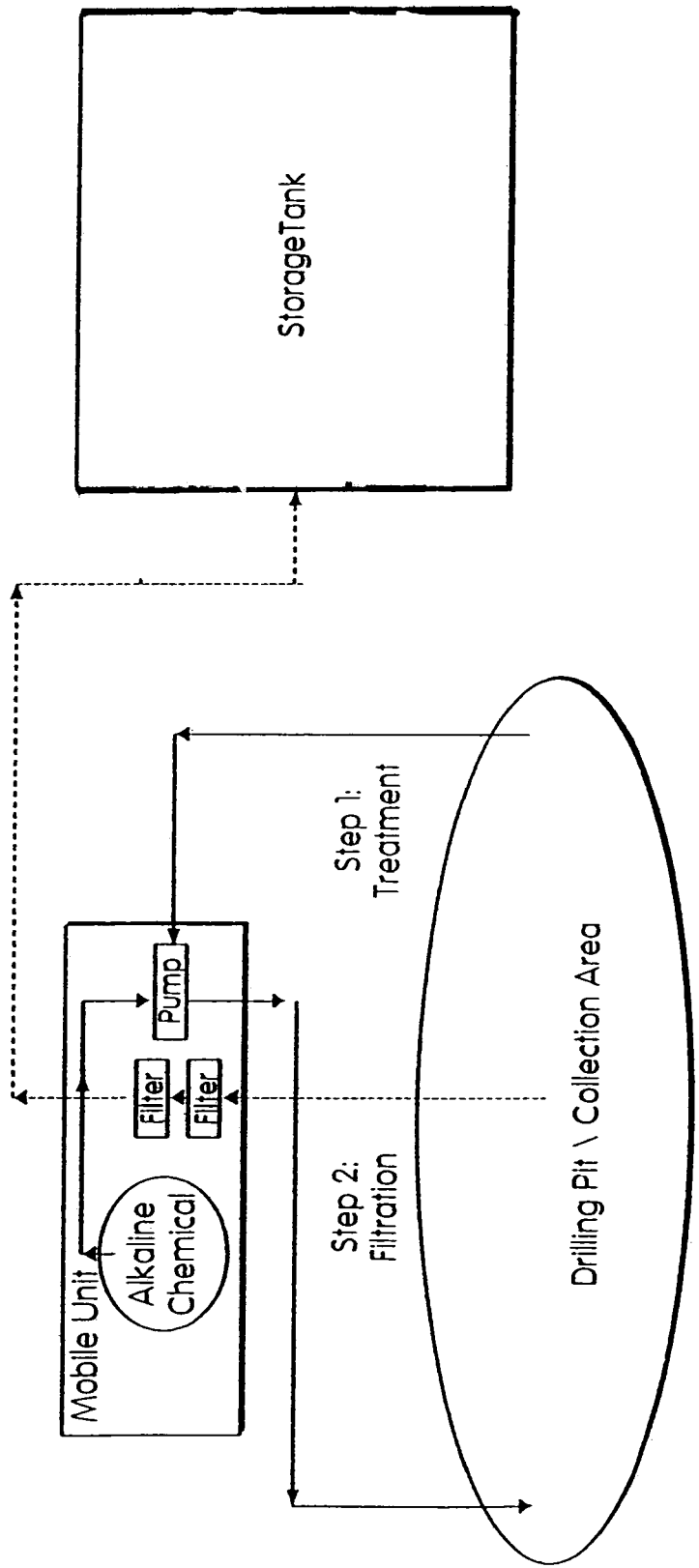
FIG. 1 is a schematic illustrating one embodiment of a treatment method or apparatus according to the present invention.

The present invention provides a mobile treatment process and apparatus for use in treating waste fluid products from oil and natural gas drilling operations. In particular, the mobile treatment apparatus is positioned to treat the drilling fluid waste within fluid waste collection areas such as drilling pits through a multi-step process that includes chemical precipitation and filtration. After treatment using the process of the present invention, the resulting fluids can be reused in future drilling operations.

In a preferred embodiment, the on-site treatment of drilling fluid waste involves the steps of: (a) bringing a mobile treatment apparatus on-site to the waste collection area or drilling pit associated with an oil or gas well drilling operation and positioning the apparatus to allow the fluid waste to be pumped through the treatment apparatus and then back to the fluid waste collection area; (b) adding a alkaline agent to the waste fluid product as it is pumped through the treatment apparatus, so as to bring the fluid to a desirable pH range and also to cause selective soluble contaminants to form a precipitate; (c) clarifying the fluid waste by allowing the precipitate of insoluble contaminants, through flocculation, to settle and form a sludge at the bottom of the waste collection area or drilling pit; (d) filtering the clarified fluids to satisfy applicable environmental and industrial requirements; and (e) storing the treated water product for use in connection with future drilling operations. FIG. 1 illustrates, in a schematic format, the principle elements of the preferred embodiment of the present invention. The drilling pit or collection area in FIG. 1 is at the drilling site. The fluids are pumped from the drilling pit and processed according to one embodiment of the present invention. The fluids are then returned to the drilling pit to wait until they are removed a second time to be filtered. After the fluids are filtered they may be stored in a storage tank.

The alkaline agent used in a preferred embodiment of the invention is a liquid sodium hydroxide (NaOH) 20% solution (also known as caustic soda). Using a liquid sodium hydroxide 20% solution as an alkaline agent has several benefits as follows: (i) a 20% liquid sodium hydroxide solution has a desirable freezing point of −26° F., making it suitable for use in drilling operations conducted during the winters of the Appalachian region of the United States; (ii) it is readily available in a variety of portable containers; (iii) it has a quicker reaction time; (iv) it dissolves into solution with less agitation than that which is required with other agents; (v) it reduces the quantity of solid waste generated (which requires later disposal); (vi) it generates an improved homogeneous mixture; (vii) it generates less turbidity and provides for better floc identification; and (viii) requires less chemical by volume and weight.

Other alkaline agents may be used, however, including sodium hydroxide solutions with other concentrations; lime in any of its various physical and chemical forms such as quicklime, hydrated lime and crushed limestone; ammonium hydroxide and other alkaline hydroxides; and combinations of these materials. In general, the alkaline agent should be sufficiently basic alone, or in combination with other agents, to enable the pH level of the waste fluids to increase to a pH range of about 10.3 to 10.5 when sampled upon initial discharge from the treating apparatus and before return to the fluid waste collection area. Variations from the ideal pH range are possible, but such variations my affect the quality of the treated water and the treatment time and materials. The pH can be as low as about 9.0, which would result in more than 30 mg/l of iron. The pH can be as high as about 12.0 with a resulting iron concentration of less than 15 mg/l. The pH range is a function of the customer's requirements, but a practical pH range of about 9.0 to about 12.0 should be maintained.

Because the fluids being treated will ultimately require disposal, the solubility of the alkaline treating agent in the fluids should not be so high as to cause their subsequent neutralization to be burdensome. In the case of sodium hydroxide, solubility in water is total, thus forming no insoluble precipitates from the neutralization process and therefore reducing the total waste solids generated. In addition, the salt concentration following neutralization is relatively low for this preferred alkaline agent.

The alkaline treating agent, in a preferred embodiment, also acts to cause soluble contaminants in the fluid to form a precipitate. In particular, the alkaline treating agent should interact with soluble iron to form ferric hydroxide precipitates. To facilitate the contaminant precipitation and also to obtain a homogeneous mixture of the alkaline treating agent with the fluid, it is further preferred that the drilling waste fluid is circulated and agitated in the waste collection area, after addition of the alkaline treating agent. The components of the fluids, the source of the fluids, and the methods used to generate the waste water determine what precipitates are formed. Therefore, the precipitates may be any number of metals or chemicals, but will often be heavy metals.

In connection with the clarification step of the treatment process, it is preferable that the precipitation generates a floc greater than about 5 microns in diameter. At this size, the precipitated floc more readily forms a layer of sludge at the bottom of the drilling pit while the fluid otherwise begins to clarify. During the clarification process, the alkaline treating agent should continue to be added until the pH of the treated fluid stabilizes at a range of about 9.9 to about 10.1. Variations from the ideal pH range are possible, but such variations may affect the quality of the treated water and the treatment time and materials. The pH can be as low as about 9.0 or as high as about 12.0. The pH range is a function of the customer's requirements, but a practical pH range of about 9.0 to about 12.0 should be maintained.

As part of the filtration step of the treatment process of the present invention, it is preferable to withdraw the clarified fluid above the layer of sludge formed at the bottom of the drilling pit by using a floating suction line to pump the liquid into multi-stage bag filters. In order to meet industrial and environmental requirements, it is also preferable that this filtering process involves the use of filters that will filter suspended solids larger than 5 microns in diameter from the treated fluid.

In a preferred embodiment, the resulting fluid product, after precipitation and filtration, will have less than about 30 ppm of iron, a pH range of between about 6 and 10 and suspended solids having a diameter of less than about 5 microns. As such, the treated fluid will satisfy environmental and industrial requirements for reuse as drilling fluid or fracturing water. After treatment, the resulting fluid product is placed into storage tanks for later use in future drilling operations.

In accordance with the preferred embodiment of the present invention, the mobile treatment apparatus associated with the treatment process consists of a mobile unit, such as a box trailer, a cargo trailer, a van, or a pick-up truck containing the equipment, supplies and materials necessary to conduct the treatment and precipitation processes described above. In actual use, the mobile apparatus, in one embodiment, has consisted of a U.S. Cargo box trailer with 7,000 lb. registered gross vehicle weight, with the trailer containing (i) a bag filter unit; (ii) an 8 horsepower self priming pump; (iii) a chemical suction/venturi line for use in delivering the alkaline agent from an alkaline tank to the fluid waste as it is pumped from the waste collection area; (iv) valves, hoses and fittings for the chemical treatment and filtration steps; and (v) an area sufficiently large to also allow for bulk storage of the alkaline treating agent. In actual use, the trailer has been used to transport and store either 55 gallon drums or 2,780 pound tote of liquid 20% sodium hydroxide solution. Variations on all of these components of the mobile apparatus are possible within the teachings of this invention. For example, the filter unit should not be limited to bag filter units and the pump should not be limited to an 8 horsepower self priming pump. By way of further detail, actual operations involving the mobile treatment apparatus and associated on-site treatment process have involved the following process steps. First, the mobile treatment apparatus is positioned so that waste fluids can be pulled from one end of the waste collection area, pumped through the treatment apparatus for addition of the alkaline agent, and discharged back into the other end of the drilling pit to obtain a good circulation of the waste collection area. The discharge hose associated with the mobile treatment apparatus may need to be moved several times to obtain a good mixture in the waste collection area.

Second, it is important to observe the condition of any drilling pit used as a waste collection area and the liner placed within the pit. More specifically, the liner should not be floating, which is indicative of a hole in the liner. Also, the liner should be checked for any large holes or rips in the sides. Further, it should be determined whether there are any floating debris of the top of the fluid within the waste collection area. If it is determined that there is a hole in the liner or that oil is floating on top of the waste fluid, treatment may not be feasible.

If the waste collection area conditions are satisfactory (i.e. there is not a hole in the liner and no oil is floating on top of the drilling pit fluid), a pump suction inlet hose (with strainer) is attached from the mobile treatment apparatus to one end of the waste collection area and a pump discharge hose is attached to the mobile treatment apparatus and placed at the other end of the waste collection area. In a preferred embodiment, 3-inch hoses have been used for both the inlet and discharge functions, although other hose sizes may be utilized. After installation of the hoses, fluid is pumped through the treatment apparatus and sampled for (a) pH, (b) percentage by weight of sodium chloride and (c) the concentration of iron (mg/l).

While drilling waste fluids are pumping through the treatment apparatus, an alkaline treating agent is added to the fluids before they are returned to the waste collection area. In a preferred embodiment, the alkaline treating agents are applied in sufficient amount to maintain a pH range of about 9.0 to about 12.0 (with the preferred range being about 10.3 to about 10.5) in the waste fluid before it is returned to the drilling pit.

The alkaline treating agent should also be added in sufficient amount to begin the precipitation of soluble contaminants such as iron contaminants and the associated floc formation of ferric hydroxide precipitates. To insure that proper floc precipitation is occurring, a sample of the treated fluid is obtained before it returns to the drilling pit. Floc formation should be immediate, with floc precipitating to the bottom of the graduated cylinder, leaving a clear supernate. If the floc rises to the top of the sample, the treatment process should be stopped immediately and the operator should attempt to determine why the floc is not settling. For example, oil in the drilling pit fluids may prevent proper floc precipitation.

If proper floc precipitation is obtained, the alkaline chemical agent should continue to be added, while the drilling waste fluid is pumped through the mobile treatment apparatus, until the pH of the treated drilling pit fluid, at the perimeters of the waste collection area, are sampled and found to be in a range of about 9.0 to about 12.0 (with an ideal range being about 9.9 to about 10.1.)

Thereafter, the fluids in the waste collection area are allowed to settle for approximately 16 hours before filtering. The fluids can settle for less than 16 hours, but they cannot settle for more than 24 hours due to problems arising from bacteria and algae growth. A shorter settling time will require more filtration and likely will yield less total treated water. The filtering procedure involves positioning the mobile treatment apparatus between the drilling pit and storage tanks. In a preferred embodiment, filtration occurs through use of a floating suction line which draws the drilling pit fluid into multi-stage bag filters and, more specifically, a 50 micron filter in a first filter unit and a 5 micron filter in a second filter unit. Again, variations of this filtering process may be employed. Different filter sizes can be employed. Smaller micron filters will require more time and the use of more filters. Preferably filter sizes should not exceed 100 micron. The intake hose within the drilling pit should be carefully placed so that all fluids can be filtered, but so that the hose does not contact any solids from the bottom of the drilling pit.

In operation, it has been found that it is preferable to monitor the pressure on the filtering vessels. When pressure increases to about 20 psi on any filter bag unit, the pumps should be shut down and the corresponding filter bag replaced.

In addition, samples should be periodically obtained after the fluids pass through the 5-micron unit filter bag to ensure that the filter is working properly. The fluids should be clear in color with few suspended particles. If the fluids are not clear, the filtering process should be stopped to determine the reason for this discrepancy. For example, filters may be clogged or the intake hose could be pulling solids from the bottom of the drilling pit.

Before final transport of the treated and filtered fluids to storage vessels, the treated fluids should be evaluated in respect to pH level, the percentage of sodium chloride and the concentration of iron. The remediated drilling fluids can then be transported to a new well drilling site or used in the same drilling operation.

What is claimed is:

1. A mobile water treatment process for use in treating waste fluids from oil and gas well drilling operations in a fluid waste collection area at the site of such operations, said processing comprising:
   a. pumping said waste fluids from said collection area, through a mobile treatment apparatus and back into said collection area;
   b. adding an alkaline agent to said waste fluids as said waste fluids are pumped through the mobile treatment apparatus in an amount necessary to bring the pH of said waste fluids to a range of about 9.0 to 12.0 before return to said collection area and also sufficient to cause soluble contaminants in the waste fluids to form a precipitate;
   c. allowing said waste fluids to clarify as said precipitate of soluble contaminants, through flocculation, settle and form a sludge at the bottom of said collection area;
   d. filtering said waste fluids in said mobile water treatment apparatus after said clarification step; and
   e. pumping said waste fluids, after said filtration step, into storage tanks for reuse at future drilling operations.

2. The process of claim 1, wherein said alkaline agent is added to said waste fluids in an amount necessary to bring the pH of said waste fluids to a range of 9.0 to 10.3 before return to said collection area.

3. The process of claim 1, wherein said alkaline agent is added to said waste fluids in an amount necessary to bring the pH of said waste fluids to a range of 10.3 to 10.5 before return to said collection area.

4. The process of claim 1, wherein said alkaline agent is added to said waste fluids in an amount necessary to bring the pH of said waste fluids to a range of 10.5 to 12.0 before return to said collection area.

5. The process of claim 1, wherein, in said waste collection area, after the addition of said alkaline agent, waste fluids are circulated and agitated so as to obtain a homogeneous mixture of said alkaline agent and said waste fluids.

6. The process according to claim 1, wherein said alkaline agent is added to said waste fluid, as said waste fluid is pumped through said treatment apparatus, in an amount sufficient to bring the pH level of said waste fluid in said waste collection area to a range of about 9.0 to 12.0.

7. The process according to claim 6, wherein said alkaline agent is added to said waste fluid, as said waste fluid is pumped through said treatment apparatus, in an amount sufficient to bring the pH level of said waste fluid in said waste collection area to a range of about 9.0 to 9.9.

8. The process according to claim 6, wherein said alkaline agent is added to said waste fluid, as said waste fluid is pumped through said treatment apparatus, in an amount sufficient to bring the pH level of said waste fluid in said waste collection area to a range of about 9.9 to 10.1.

9. The process according to claim 6, wherein said alkaline agent is added to said waste fluid, as said waste fluid is pumped through said treatment apparatus, in an amount sufficient to bring the pH level of said waste fluid in said waste collection area to a range of about 10.1 to 12.0.

10. The process according to claim 1, wherein said soluble contaminants include soluble iron which, upon reaction with said alkaline agent, forms ferric hydroxide precipitate.

11. The process according to claim 1, wherein said alkaline agent is added in sufficient quantity to cause the flocculation of precipitates and other insoluble contaminants to a size having a diameter greater than about 5 microns.

12. The process according to claim 1, wherein said alkaline agent is liquid sodium hydroxide 20% solution.

13. The process according to claim 1, wherein said alkaline agent is selected from the group consisting of sodium hydroxide solutions, lime, quicklime, hydrated lime, crushed limestone, ammonium hydroxide, alkaline hydroxides and combinations of these agents.

14. The process according to claim 1, wherein said clarification step occurs for 24 hours or less.

15. The process according to claim 14, wherein said clarification step occurs for 8 hours or less.

16. The process according to claim 14, wherein said clarification step occurs for between 8 and 16 hours.

17. The process according to claim 14, wherein said clarification step occurs for between 16 and 24 hours.

18. The process according to claim 1, wherein said filtration step includes the use of a floating suction line to remove said waste fluids from said collection area.

19. The process according to claim 1, wherein said filtration step involves the use of filters associated with the pumping of said waste fluid through said treatment apparatus to filter suspended solids from said waste fluids having a diameter of greater than about 5 microns.

20. The process according to claim 19, wherein said filters are bag filters.

21. The process according to claim 19, wherein said filters are multi-stage bag filters.

22. The process according to claim 21, wherein said multi-stage bag filters include a 50 micron filter in a first filter unit and a 5 micron filter in a second filter unit.

23. The process according to claim 21, wherein said multi-stage bag filters include filter sizes up to and including 100 micron.

24. The process according to claim 1, wherein said waste fluids, after said filtration step have less than about 30 mg/l of iron, a pH of between about 9 and 12 and suspended solids having diameters no greater than about 5 microns.

25. A mobile water treatment process for use in treating waste fluids from oil and gas well drilling operations in a waste collection area at the site of such operations, said processing comprising:
   a. pumping said waste fluids from said collection area, through a mobile treatment apparatus and back into said collection area;
   b. adding an alkaline agent to said waste fluid as said waste fluids are pumped through the mobile treatment apparatus in an amount necessary to bring the pH of said waste fluids to a range of about 10.3 to 10.5 before return to said collection area and also sufficient to cause soluble contaminants in the waste fluid to form a precipitate;
   c. allowing said waste fluids to clarify as the precipitate and soluble contaminants, through flocculation, settle and form a sludge at the bottom of said collection area; and
   d. filtering said waste fluids in said mobile water treatment apparatus after said clarification step; and
   so that the said waste fluid, after said filtration step, has less than about 30 mg/l of iron, a pH of between about 9 and 12 and suspended solids having diameters no greater than about 5 microns.

26. A mobile water treatment process for use in treating waste fluids from well drilling operations in a fluid waste collection area at the site of such operations, said processing comprising:
   a. pumping said waste fluids from said collection area, through a mobile treatment apparatus and back into said collection area;
   b. adding an alkaline agent to said waste fluids as said waste fluids are pumped through the mobile treatment apparatus, before return to said collection area, in an amount necessary to bring the pH of said waste fluids to a range sufficient to cause soluble contaminants in the waste fluid to form a precipitate;
   c. allowing said waste fluids to clarify as said precipitate of soluble contaminants, through flocculation, settle and form a sludge at the bottom of said collection area;
   d. filtering said waste fluids in said mobile treatment apparatus after said clarification step; and
   e. pumping said waste fluids, after said filtration step, into storage tanks for reuse at future drilling operations.

* * * * *